(12) United States Patent
Buhl et al.

(10) Patent No.: US 12,085,055 B2
(45) Date of Patent: Sep. 10, 2024

(54) WIND TURBINE BLADE DAMPING DEVICE

(71) Applicant: LM WIND POWER A/S, Kolding (DK)

(72) Inventors: Thomas Buhl, Kolding (DK); Jesper Madsen, Kolding (DK); Jordy Hertel Nilsson Van Kalken, Kolding (DK)

(73) Assignee: LM WIND POWER A/S, Kolding (DK)

( * ) Notice: Subject to any disclaimer, the term of this patent is extended or adjusted under 35 U.S.C. 154(b) by 80 days.

(21) Appl. No.: 17/769,786

(22) PCT Filed: Jan. 19, 2021

(86) PCT No.: PCT/EP2021/051014
§ 371 (c)(1),
(2) Date: Apr. 18, 2022

(87) PCT Pub. No.: WO2021/148379
PCT Pub. Date: Jul. 29, 2021

(65) Prior Publication Data
US 2022/0356865 A1 Nov. 10, 2022

(30) Foreign Application Priority Data
Jan. 24, 2020 (GB) ..................................... 2001046

(51) Int. Cl.
*F03D 1/06* (2006.01)
*F03D 13/10* (2016.01)
(52) U.S. Cl.
CPC ......... *F03D 1/0675* (2013.01); *F03D 1/0633* (2013.01); *F03D 1/0658* (2013.01);
(Continued)

(58) Field of Classification Search
CPC .... F03D 1/0675; F03D 1/0633; F03D 1/0658; F03D 13/10; F05B 2240/121;
(Continued)

(56) References Cited

U.S. PATENT DOCUMENTS 9,267,491 B2   2/2016  Vossler et al.
9,366,222 B2 * 6/2016  Nielsen ................. F03D 1/0633
(Continued)

FOREIGN PATENT DOCUMENTS

CN   103485976 A   1/2014
CN   107143470 A   9/2017
(Continued)

*Primary Examiner* — Sabbir Hasan
*Assistant Examiner* — Andrew J Marien
(74) *Attorney, Agent, or Firm* — Nath, Goldberg & Meyer; Jerald L. Meyer; Tanya E. Harkins

(57) ABSTRACT

A blade damping device for damping vibrations during standstill of a wind turbine blade, wherein the blade damping device is adapted to be detachably attached to the pressure side and/or the suction side of the airfoil region of the wind turbine blade, the blade damping device comprising a base plate adapted to conform to the exterior shape of the wind turbine blade when the blade damping device is attached to the wind turbine blade, and a spoiler protruding from the base plate to a spoiler height along a height direction and having a spoiler length along a length direction, the height direction being adapted to extend outwardly from the wind turbine blade, wherein the spoiler height is adapted to be at least 20% of a chord line located at two thirds of the blade length along the longitudinal axis from the root end of the wind turbine blade.

20 Claims, 6 Drawing Sheets

(52) U.S. Cl.
CPC ........ *F03D 13/10* (2016.05); *F05B 2240/121* (2013.01); *F05B 2240/122* (2013.01); *F05B 2240/305* (2020.08); *F05B 2240/306* (2020.08); *F05B 2240/3062* (2020.08); *F05B 2260/964* (2013.01)

(58) Field of Classification Search
CPC .......... F05B 2240/122; F05B 2240/305; F05B 2240/306; F05B 2240/3062; F05B 2260/966
See application file for complete search history.

(56) References Cited

U.S. PATENT DOCUMENTS

| | | | |
|---|---|---|---|
| 9,624,782 B2* | 4/2017 | Booth | F01D 5/30 |
| 9,638,164 B2* | 5/2017 | Vedula | F03D 1/0658 |
| 9,759,186 B2* | 9/2017 | Grabau | F03D 1/0633 |
| 10,066,598 B2* | 9/2018 | Gil | F03D 13/40 |
| 10,202,963 B2* | 2/2019 | Altmikus | F03D 1/0633 |
| 11,448,183 B2* | 9/2022 | Arce | F03D 1/0675 |
| 2012/0269644 A1* | 10/2012 | Enevoldsen | F03D 1/065 |
| | | | 416/235 |
| 2016/0177915 A1* | 6/2016 | Gonzalez | F03D 1/0675 |
| | | | 416/223 R |

FOREIGN PATENT DOCUMENTS

| | | |
|---|---|---|
| EP | 3225834 A1 | 10/2017 |
| EP | 3333416 A1 | 6/2018 |
| GB | 2527035 A | 12/2015 |
| WO | 2013020959 A1 | 2/2013 |

* cited by examiner

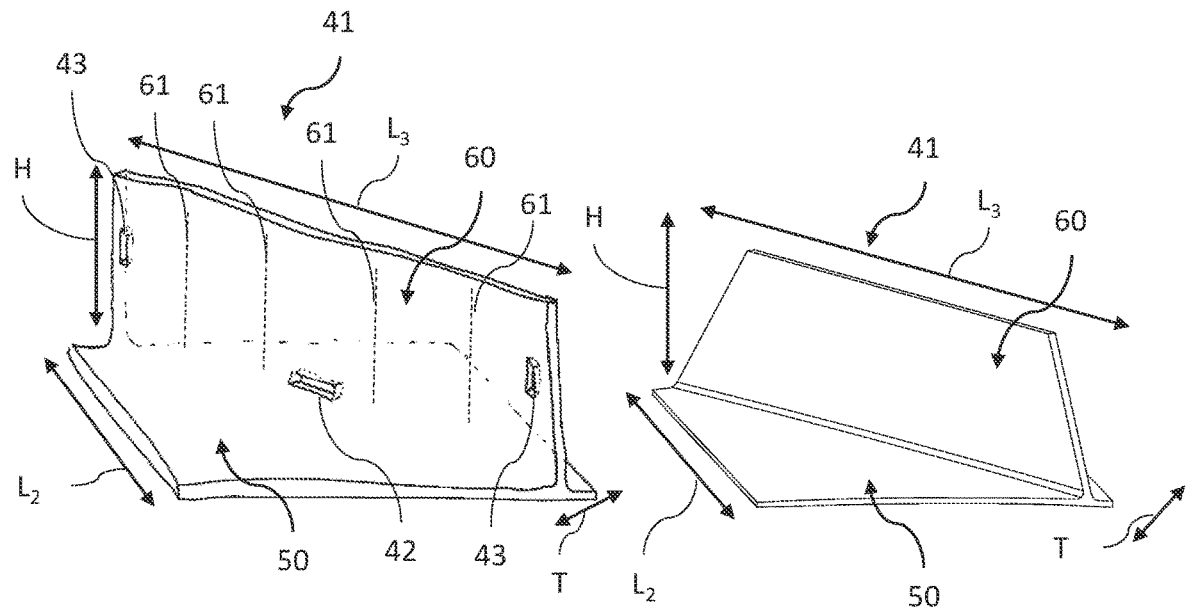
Fig. 3a        Fig. 3b
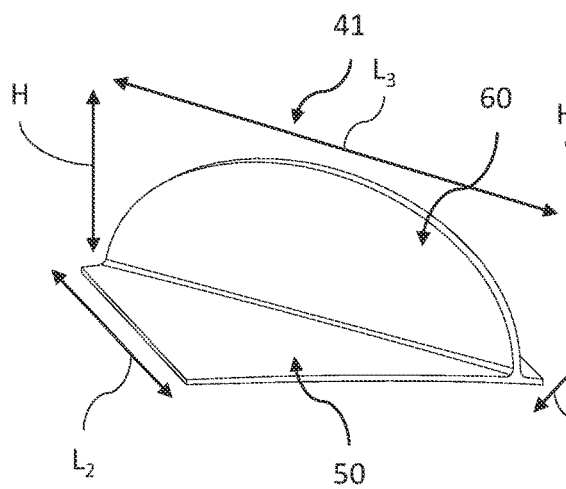   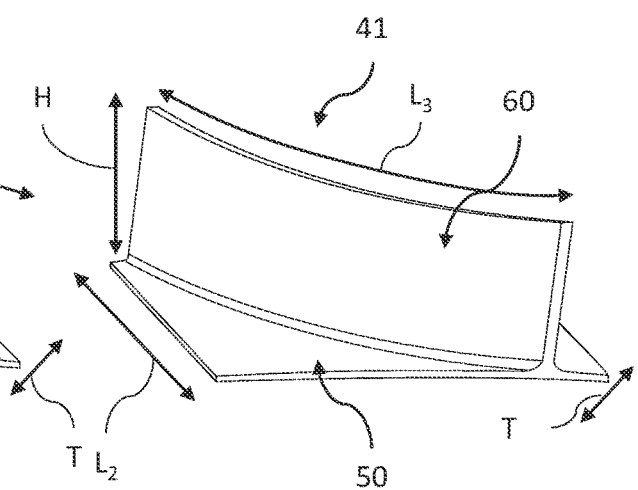
Fig. 3c        Fig. 3d

WIND TURBINE BLADE DAMPING DEVICE

This is a National Phase Application filed under 35 U.S.C. 371 as a national stage of PCT/EP2021/051014, filed Jan. 19, 2021, an application claiming the benefit of Great Britain Application No. 2001046.8, filed Jan. 24, 2020, the content of each of which is hereby incorporated by reference in its entirety.

TECHNICAL FIELD

The present disclosure relates to a blade damping device for a wind turbine blade and a method of attaching such a blade damping device to a wind turbine blade.

BACKGROUND

In the time frame between the installation of a wind turbine blade on a hub of a wind turbine and the start of operation, the wind turbine blade is subject to two types of aerodynamic vibrations that can lead to critical blade vibrations: stall induced vibrations and vortex shedding induced vibrations. Stall induced vibrations happen at certain ranges of inflow angles where the blade has negative aerodynamic damping, i.e. vibrations increase over time, and vortex shedding induced vibrations happens all the time, however, the magnitude and frequency of the vibrations gets critical when the inflow angle is around +90° or −90°. These vibrations manifest as edgewise vibrations (also sometimes referred to as in-plane vibrations) and flapwise vibrations (also sometimes referred to as out-of-plane vibrations).

In order to solve this issue, it has been attempted to provide the wind turbine blade with an aerodynamic device prior to installing the wind turbine blade and removed after installation prior to commencing operation of the wind turbine. The prior art aerodynamic devices are typically both adapted to reduce coherence along blade span to ensure that aerodynamic vibrations are happening independently over the blade span as the blade will vibrate if aerodynamic vibrations are synchronized and in phase along some part of the blade span, and to modify the vibration frequency as blade vibration will happen if aerodynamic vibration frequency overlaps with natural frequency of the blade which mainly apply to the vortex shedding induced vibrations.

However, these prior art aerodynamic devices have been found to under some conditions to inadequately mitigate a natural frequency resonance for especially edgewise blade vibrations which can lead to critical blade failures.

SUMMARY

On this background, it may be seen as an object of the present disclosure to provide a blade damping device which, when attached to a wind turbine blade in standstill, mitigates blade vibrations. Another object of the present disclosure is to provide a method for easily attaching such a blade damping device prior to installation of the wind turbine blade.

One or more of these objects may be met by aspects of the present disclosure as described in the following.

A first aspect of this disclosure relates to a blade damping device for damping vibrations during standstill of a wind turbine blade having a root region with a root end and an airfoil region with a tip end between which a longitudinal axis of the blade extends, a leading edge and a trailing edge between which a chord line extends transversely to the longitudinal axis, and a pressure side and a suction side on opposite sides of the chord line, wherein the blade damping device is adapted to be detachably attached to the pressure side and/or the suction side of the airfoil region of the wind turbine blade, the blade damping device comprising:
  a base part, such as a base plate, adapted to conform to the exterior shape of the wind turbine blade when the blade damping device is attached to the wind turbine blade, and
  a spoiler, such as a spoiler plate, protruding from the base part to a spoiler height along a height direction and having a spoiler length along a length direction, the height direction being adapted to extend outwardly from the wind turbine blade,
wherein the spoiler height is adapted to be at least 20% of a chord line length located at two thirds of the blade length along the longitudinal axis from the root end of the wind turbine blade.

It has been identified that a wind turbine blade provides sufficient aerodynamic damping in the flapwise direction due to the flapwise displacement of a relatively large volume of air but not in the edgewise direction as the edgewise air displacement is much lower, and that the prior art aerodynamic devices do not provide sufficient edgewise damping as they are mainly disturbing the air flow in close proximity to the blade.

The blade damping device of this disclosure may advantageously, when attached to a wind turbine blade, provides sufficient aerodynamic damping in the edgewise direction in combination with sufficient flow disturbance to mitigate vortex shedding induced vibrations. In particular, by arranging a spoiler with a sufficient spoiler height, it has been found that adequate edgewise damping and flow disturbance is provided by the blade damping device by increasing the air volume displaced by edgewise vibrations. This has the advantage of substantially reducing or even eliminating the risk of blade failure during standstill caused by edgewise vibrations by both damping the vibrations and disturbing the flow to reduce or prevent vortex shedding and/or stalling causing vibrations.

Additionally or alternatively, the base part may be adapted to cover at most 50%, preferably at most 40%, more preferably at most 30%, of the circumference of the wind turbine blade when the blade damping device is attached to the wind turbine blade. In this way, the blade damping device may be easier to remove from the blade since the blade damping device only extends on one side of the wind turbine blade.

Additionally or alternatively, the base part may be adapted to cover between 5% to 50%, preferably between 10% to 40%, more preferably between 20% to 30%, of the circumference of the wind turbine blade when the blade damping device is attached to the wind turbine blade. In this way, the blade damping device may be easier to remove from the blade only extends on one side of the wind turbine blade while still extending sufficiently to be securely fastened to the wind turbine blade.

Additionally or alternatively, a resilient material, e.g. a polymer material such as a foamed polymer material, of the base part may be adapted to conform to the exterior shape of the wind turbine blade when the blade damping device is attached to the wind turbine blade. This may be a particularly simple way of enabling the base part to fit tightly around the exterior surface of the wind turbine blade.

Additionally or alternatively, the blade damping device is adapted for being detached prior to commencing operation of the wind turbine blade.

Additionally or alternatively, the spoiler height may be adapted to be at least 20%, 30%, 40%, 50%, 60%, 70%, 80%, 90%, or 100% of said chord line length. Additionally or alternatively, the spoiler height may be at least 20 cm, 30 cm, 40 cm, 50 cm, 60 cm, 70 cm, 80 cm, 90 cm, or 1 meter. By increasing the spoiler height, the area of the spoiler projected on a plane normal to the chord line is increased and therefore both the edgewise aerodynamic damping is increased by increasing the edgewise air displacement and the flow disturbance is increased since the spoiler protrudes farther into the air flow.

Additionally or alternatively, the length direction and height direction are perpendicular.

Additionally or alternatively, the spoiler may have a spoiler thickness extending along a thickness direction perpendicular to the height and length directions.

Additionally or alternatively, the spoiler may be a first spoiler forming part of one or more spoilers of the blade damping device and protruding from the base part to a first spoiler height along a height direction and having a first spoiler length along a first length direction. The one or more spoilers may include a second spoiler, optionally a third spoiler, and optionally a fourth spoiler optionally all protruding from the same base part to the same or different spoiler heights.

Additionally or alternatively, the length direction may be straight or curved or even comprise a corner.

Additionally or alternatively, the shape of the spoiler may be rectangular, square, rounded, semicircle, or trapezoidal.

Additionally or alternatively, the blade damping device may be adapted to be positioned on the blade at a first chord line so that the spoiler projected onto a plane normal to the first chord line has a length along the longitudinal axis of the blade of at least 10%, 20%, 30%, 40%, 50%, 60%, 70%, 80%, 90%, 100%, 110%, 120%, 130%, 140%, or 150% of the spoiler height. By arranging the spoiler in this way, the area of the spoiler projected on a plane normal to the chord line is increased and consequently increases both the edgewise aerodynamic damping by increasing the edgewise air displacement and the flow disturbance by providing a larger obstacle to the air flow over the blade.

Additionally or alternatively, the blade damping device may be adapted to be positioned on the blade at a first chord line so that the length direction forms a first angle with respect to the first chord line in the range of more than 0 degrees to 90 degrees, in the range of 20 to 90 degrees, or in the range of 30 to 90 degrees, or in the range of 30 to 60 degrees, or in the range of 40 to 50 degrees, or about 45 degrees. By increasing the first angle, the area of the spoiler projected on a plane normal to the chord line is increased and therefore increasing the edgewise aerodynamic damping by increasing the edgewise air displacement. However, if flow disturbance is also desired, the first angle may advantageously be in the range of more than 0 degrees to less than 90 degrees since the spoiler will thus disturb the flow in both spanwise direction and edgewise direction of the blade. A 45 degree first angle has been found to be a good compromise between edgewise damping and flow disturbance.

Additionally or alternatively, the blade damping device may be adapted to be positioned on the blade at a first chord line so that the height direction forms a second angle with respect to the first chord line of more than 0, 10, 20, 30, 40, 50, 60, 70, or 80 degrees, or the second angle is about 90 degrees. By increasing the second angle, the area of the spoiler projected on a plane normal to the chord line is increased and therefore increasing both the edgewise aerodynamic damping by increasing the edgewise air displacement and the edgewise flow disturbance by protruding the spoiler farther into the air flow.

Additionally or alternatively, the base part may be elongated along a longitudinal direction, the base part being adapted to be arranged so that the longitudinal direction is parallel with respect to the longitudinal axis of the wind turbine blade, and wherein the spoiler is oriented with the length direction at an angle of 0 degrees to less than 90 degrees with respect to the longitudinal direction of the base part. Alternatively, the spoiler may be oriented with the length direction at an angle of 0 to 70, 0 to 60, 40 to 50, or about 45 degrees with respect to the longitudinal direction of the base part.

Additionally or alternatively, the height direction may be substantially perpendicular with respect to the base part.

Additionally or alternatively, the blade damping device may further comprise a first connector element, such as a first strap, adapted to detachably attach the blade damping device to the wind turbine blade.

Additionally or alternatively, the first connector element may be adapted to extend around the circumference of the wind turbine blade.

Additionally or alternatively, wherein the first connector element may comprise a first release device adapted to, upon activation, detach the first connector element from the wind turbine blade.

Additionally or alternatively, the blade damping device, optionally the base part and/or the spoiler, comprises one or more first attachment devices, such as one or more first holes, adapted to detachably attach the base part and/or the spoiler to the first connector element. The first connector element may be adapted to pass through the one or more first attachment devices to detachably attach the blade damping device to the wind turbine blade. The one or more first attachment devices may be arranged on a centre line of the blade damping device adapted to be oriented substantially parallel to the chord line.

Additionally or alternatively, the blade damping device may further comprise a second connector element, such as a second strap, adapted to detachably attach the blade damping device to an adjacent blade damping device.

Additionally or alternatively, the blade damping device, optionally the base part or the spoiler, comprises one or more second attachment devices, such as one or more second holes. The second connector element may be adapted to pass through the one or more second holes to detachably attach the blade damping device to another blade damping device.

Additionally or alternatively, the base part may be adapted to extend from the suction or pressure side of the wind turbine blade, around the trailing and/or leading edge to the opposite side of the wind turbine blade.

Additionally or alternatively, the blade damping device may comprise or consist essentially of a foamed polymer material and/or the spoiler comprises one or more stiffening elements, such as one or more stiffening rods, which are optionally made of metal and optionally extending parallel to the height direction.

This disclosure also relates to a kit of parts comprising:
a wind turbine blade having a root region with a root end and an airfoil region with a tip end between which ends a longitudinal axis of the blade extends, a leading edge and a trailing edge between which a chord line extends transversely to the longitudinal axis, and a pressure side and a suction side on opposite sides of the chord line, and
one or more blade damping devices according to the first aspect of this disclosure.

This disclosure further relates to a wind turbine blade comprising:
- a wind turbine blade having a root region with a root end and an airfoil region with a tip end between which ends a longitudinal axis of the blade extends, a leading edge and a trailing edge between which a chord line extends transversely to the longitudinal axis, and a pressure side and a suction side on opposite sides of the chord line,
- a first blade damping device according to the first aspect of this disclosure, wherein the first blade damping device is detachably attached to the pressure side and/or the suction side of the airfoil region of the wind turbine blade so that the base part of the first blade damping device conforms to the exterior shape of the wind turbine blade, and so that the height direction extends outwardly from the wind turbine blade, wherein the spoiler height is at least 20% of a chord line located at two thirds of the blade length along the longitudinal axis from the root end of the wind turbine blade.

Additionally or alternatively, the wind turbine blade comprises a plurality blade damping devices according to the first aspect of this disclosure including the first blade damping device and a second blade damping device optionally attached by a first connector element. The first connector element may attach the first and second blade damping device to the wind turbine blade. Additionally, the plurality of blade damping devices may include a third and fourth blade damping device optionally attached by another first connector element, which may attach the third and fourth blade damping device to the wind turbine blade. The first and second blade damping devices may be attached to the third and fourth blade damping devices by a second connector element.

A second aspect of this disclosure relates to a method for damping vibrations of a wind turbine blade during standstill, comprising the steps of:
providing the kit of parts,
detachably attaching the one or more blade damping devices to the wind turbine blade,
installing the wind turbine blade with the one or more blade damping devices on a hub of a wind turbine, and
detaching the one or more blade damping devices from the wind turbine blade.

Additionally or alternatively, the step of detachably attaching the one or more blade damping devices to the wind turbine blade may be performed by attaching a first connector element to each of the one or more blade damping devices so that each first connector element extends around the circumference of the wind turbine blade and tightening each first connector element so as to detachably attach the one or more blade damping devices to the wind turbine blade.

Additionally or alternatively, the step of detaching the one or more blade damping devices from the wind turbine blade may be performed by activating a release device of each first connector element. Additionally or alternatively, the one or more blade damping devices may include a first and second blade damping device, and wherein the method may further comprise detachably attaching the first and second blade damping devices by a second connector element.

This disclosure also relates to a use of a blade damping device according to the first aspect of this disclosure for damping vibrations and/or disturbing flow during standstill of a wind turbine blade.

A person skilled in the art will appreciate that any one or more of the above aspects of this disclosure and embodiments thereof may be combined with any one or more of the other aspects of this disclosure and embodiments thereof.

BRIEF DESCRIPTION OF THE DRAWINGS

Embodiments of this disclosure will be described in more detail in the following with regard to the accompanying figures. The figures show one way of implementing the present invention and are not to be construed as being limiting to other possible embodiments falling within the scope of the attached claim set.

FIG. 3a is a schematic perspective view illustrating a first embodiment of an exemplary blade damping device with a straight rectangular shaped spoiler, FIG. 3b is a schematic perspective view illustrating a first embodiment of an exemplary blade damping device with a straight trapezoidal shaped spoiler, FIG. 3c is a schematic perspective view illustrating a first embodiment of an exemplary blade damping device with a straight round shaped spoiler, FIG. 3d is a schematic perspective view illustrating a first embodiment of an exemplary blade damping device with a curved rectangular shaped spoiler.

DETAILED DESCRIPTION OF THE INVENTION

Figure 1:
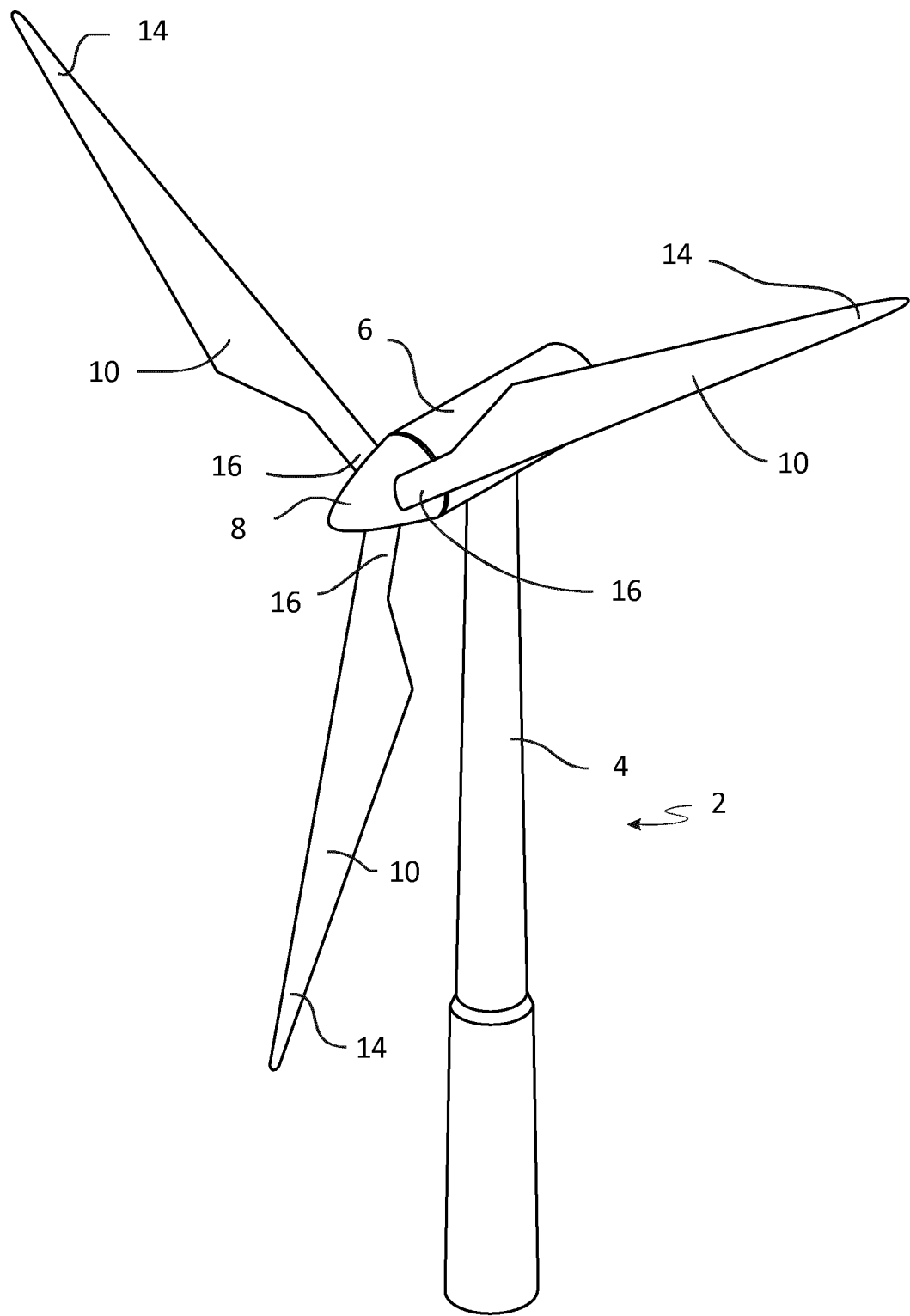
FIG. 1 is a schematic perspective view illustrating an exemplary wind turbine.

FIG. 1 illustrates a conventional modern upwind wind turbine 2 according to the so-called "Danish concept" with a tower 4, a nacelle 6, and a rotor with a substantially horizontal rotor shaft. The rotor includes a hub 8, and three blades 10 extending radially from the hub 8, each having a blade root 16 nearest the hub and a blade tip 14 furthest from the hub 8.

Figure 2:
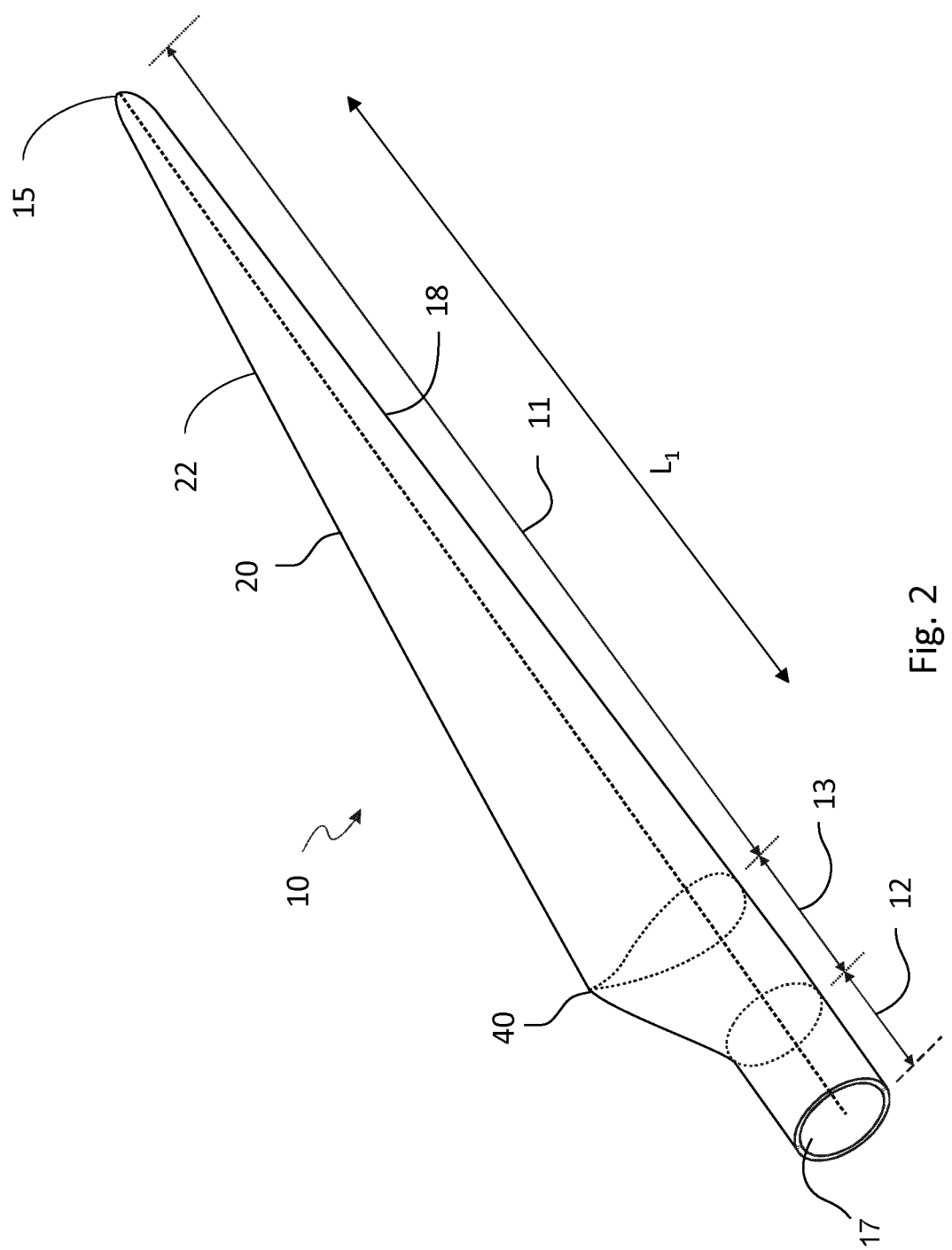
FIG. 2 is a schematic perspective view illustrating an exemplary wind turbine blade.

FIG. 2 shows a schematic view of an exemplary wind turbine blade 10. The wind turbine blade 10 extends along a longitudinal axis $L_1$ with a root end 17 and a tip end 15 and has the shape of a conventional wind turbine blade which comprises a root region 12 closest to the hub, a profiled or an airfoil region 11 furthest away from the hub and a transition region 13 between the root region 12 and the airfoil region 11. The blade 10 comprises a leading edge 18 facing the direction of rotation of the blade 10, when the blade is mounted on the hub, and a trailing edge 20 facing the opposite direction of the leading edge 18. The blade 10 comprises a pressure side 22 between the leading edge 18 and the trailing edge 20 facing the incoming wind when mounted on the hub and a suction side (see FIG. 4b) on the opposite side of the blade 10. The airfoil region 11 (also called the profiled region) has an ideal or almost ideal blade shape with respect to generating lift, whereas the root region 12 due to structural considerations has a substantially circular or elliptical cross-section, which for instance makes it easier and safer to mount the blade 10 to the hub. The diameter (or the chord line) of the root region 12 may be constant along the entire root region 12. The transition region 13 has a transitional profile gradually changing from the circular or elliptical shape of the root region 12 to the airfoil profile of the airfoil region 11. The chord line of the transition region 13 typically increases in length with increasing distance r from the hub. The airfoil region 11 has an airfoil profile with a chord line extending from the leading edge 18 to the trailing edge 20 of the blade 10. The length of the chord line decreases with increasing distance r from the hub. A shoulder 40 of the blade 10 is defined as the position, where the blade 10 has its largest chord length. The shoulder 40 is typically provided at the boundary between the transition region 13 and the airfoil region 11. It should be noted that the chord lines of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

FIG. 3a illustrates an exemplary blade damping device 41 of a first embodiment comprising a rectangular plate-shaped base part 50 and a spoiler 60. The base part 50 is elongated of about 1.5 metres along a longitudinal direction $L_2$ which is intended to be arranged in parallel to the longitudinal axis $L_1$ of the blade 10. The spoiler 60 protrudes perpendicularly from the base part 50 to a spoiler height of about 1 metre along a height direction H. This results in a spoiler height which is least 20% of a chord line located at two thirds of the blade length along the longitudinal axis $L_1$ from the root end 17 of a typical wind turbine blade 10. The spoiler further extends to a spoiler length along a straight length direction $L_3$ and to a suitable spoiler thickness to ensure mechanical stability along a thickness direction T. The length direction $L_3$, thickness direction T, and height direction H are perpendicular. The longitudinal direction $L_2$ of the base part 50 and the length direction Ls of the spoiler are arranged at about a 45 degree angle. This results in, when the longitudinal direction $L_2$ of the base part 50 is positioned parallel to the longitudinal axis $L_1$ of the blade 10, that the length direction Ls of the spoiler 60 oriented in a 45 degree angle with respect to the chord line C. The blade damping device comprises a flexible and resilient foamed polymer material so that the base part 50 conforms to the exterior shape of the wind turbine blade 10 when the blade damping device is attached to the wind turbine blade 10. The spoiler 60 may include one or more stiffening elements 61, such as one or more stiffening rods, which are optionally made of metal and optionally extending parallel to the height direction. FIG. 3b illustrates a similar blade damping device 41 with a trapezoidal shaped spoiler 60 extending along a straight length direction $L_3$. FIG. 3c illustrates a similar blade damping device 41 with a round or semi-circular shaped spoiler 60 extending along a straight length direction $L_3$. FIG. 3d illustrates a similar blade damping device 41 with a rectangular shaped spoiler 60 extending along a curved length direction $L_3$.

Figure 4A:
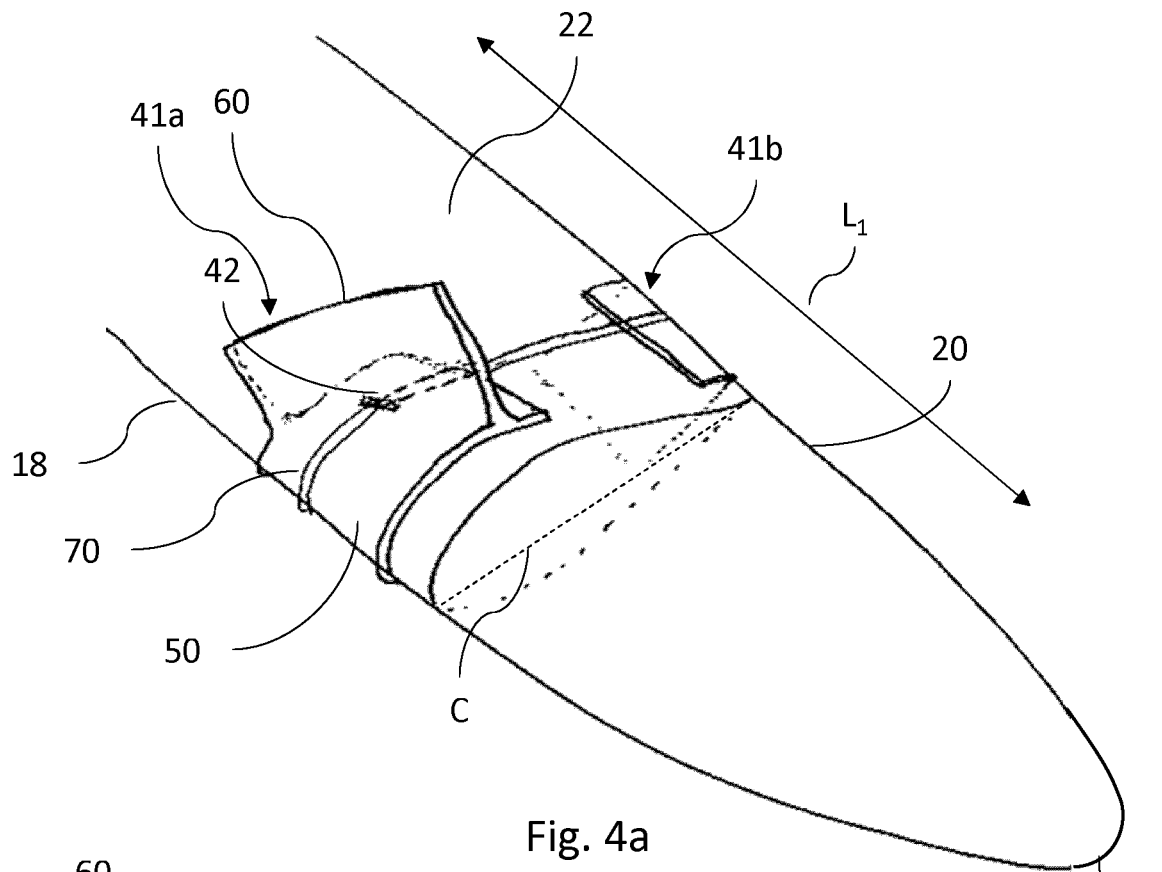
FIG. 4a is a schematic perspective view illustrating a second embodiment of two second exemplary blade damping devices attached to a section of the airfoil region of a wind turbine blade.
Figure 4B:
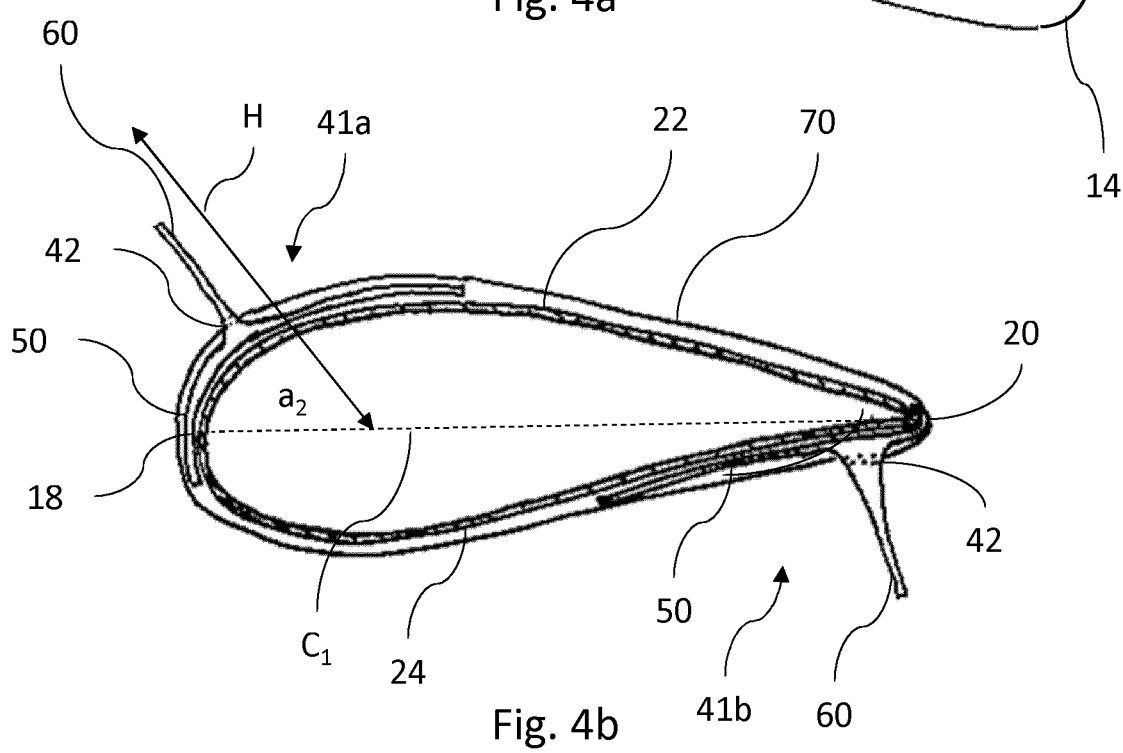
FIG. 4b is a schematic cross-sectional slice view of the two second exemplary blade damping devices of FIG. 4a, FIG. 5 is a schematic pressure side view illustrating the two second exemplary blade damping devices of FIG. 4a attached to a section of the wind turbine blade.
Figure 5:
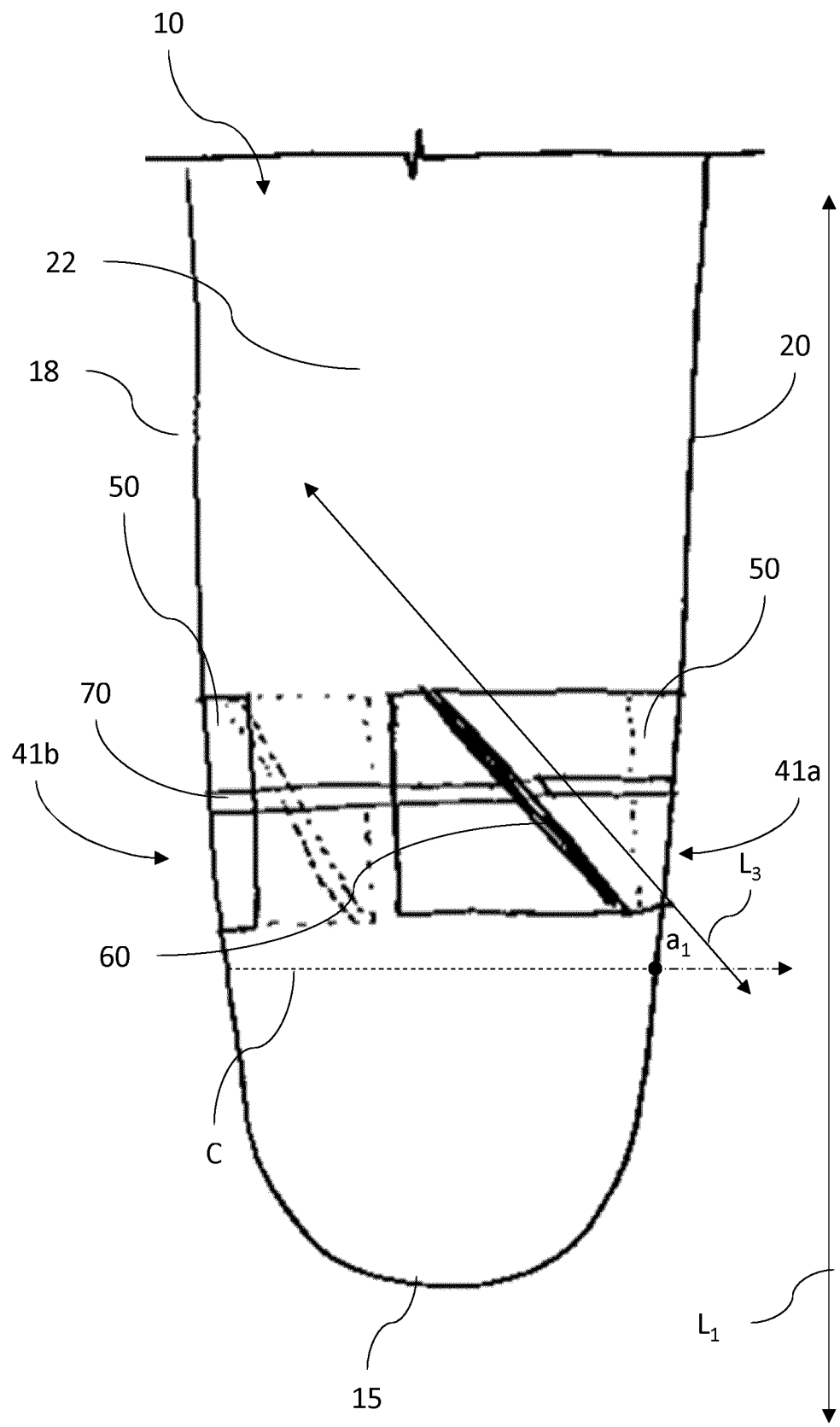
Figure 6:
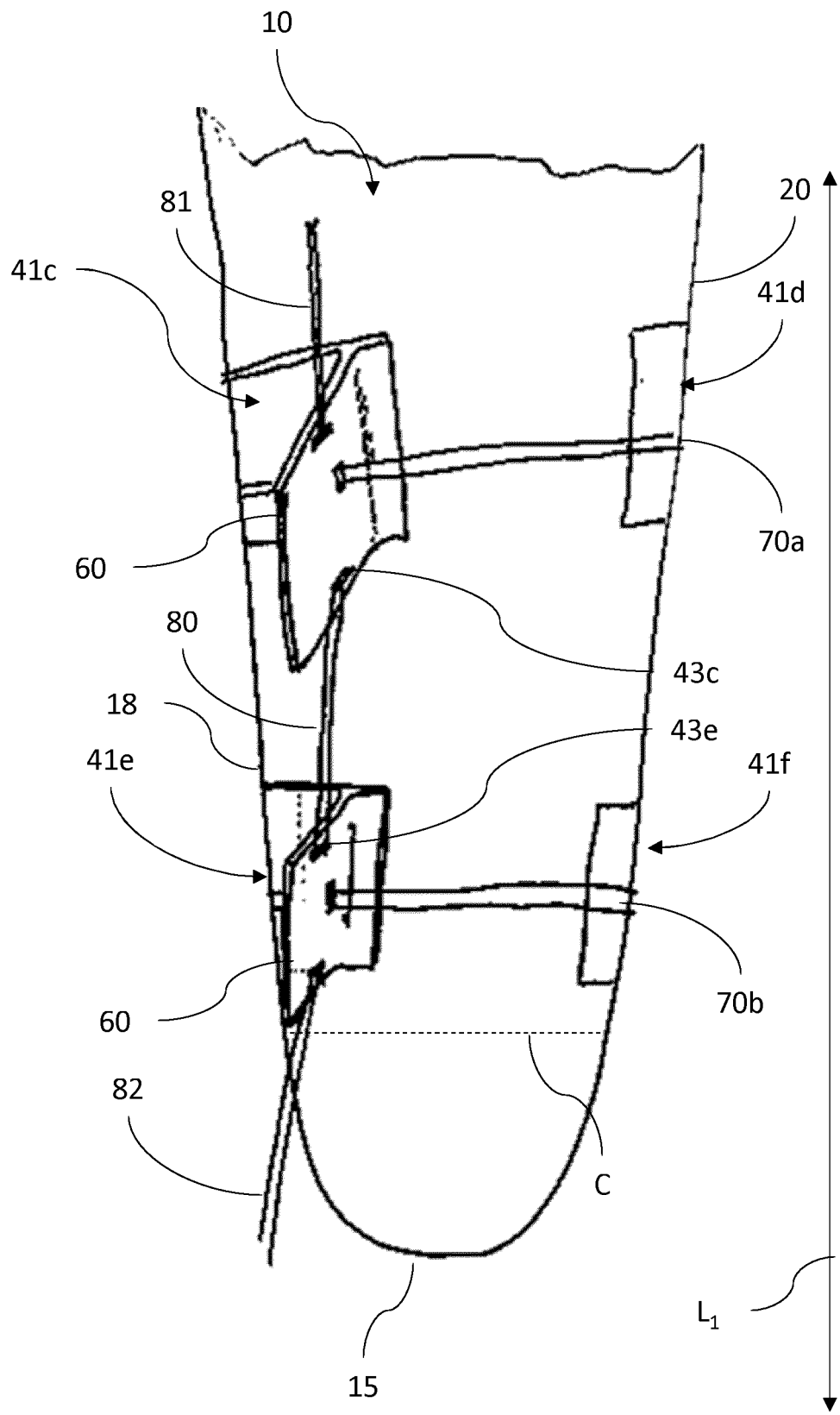
FIG. 6 is a schematic pressure side view of two pairs of third exemplary blade damping devices.

FIGS. 4a, 4b, and 5 illustrates two exemplary blade damping devices 41a, 41b of a second embodiment including a pressure side blade damping device 41a and a suction side blade damping device 41b similar to the blade damping device of the first embodiment shown in FIG. 3a but with a base part elongated in a direction perpendicular to the longitudinal direction $L_2$ so that the base part 50 of the pressure side blade damping device 41a extends from the pressure side 22 of the wind turbine blade 10 around the leading edge 18 to the suction side 24 of the wind turbine blade 10, and so that the base part 50 of the suction side blade damping device 41b extends from the suction side 24 of the wind turbine blade 10 around the trailing edge 20 to the pressure side 22 of the wind turbine blade 10. The blade damping devices 41a, 41b are positioned on the blade at a first chord line $C_1$ located at a spanwise location of the blade as best seen in FIG. 4b. An adjacent chord line C is also shown in FIGS. 4a, 5 and 6. The base part 50 of each blade damping device 41a, 41b is oriented with the longitudinal direction $L_2$ parallel to the longitudinal axis $L_1$ so that the length direction $L_3$ of the spoiler 60 forms a first 45 degree angle $a_1$ with respect to the chord line C as best seen in FIG. 5, and so that the height direction H of the spoiler 60 forms a second 45 degree angle $a_2$ with respect to a first chord line $C_1$ as best seen in FIG. 4b. Further, the spoiler 60 projected onto a plane normal to the first chord line C has a length along the longitudinal axis $L_1$ of the blade of about 1.5 times the spoiler height. A first connector element 70 in the form of a strap attaches the blade damping devices 41a, 41b to the wind turbine blade 10 by extending through the first attachment device 42 of each blade damping device 41a, 41b and around the circumference of the wind turbine blade 10 as best seen in FIG. 4b. The first connector element 70 can be detached by means of a release device (not shown), which upon activation, detaches the blade damping devices 41a, 41b from the wind turbine blade 10 e.g. by detaching ends of the first connector element 70.

FIG. 6 illustrate four exemplary blade damping devices 41c, 41d, 41e, 41f of a third embodiment similar to the blade damping devices 41a, 41b of FIGS. 4a, 4b, and 5 of the second embodiment only differing in that the length direction $L_3$ of each spoiler 60 oriented parallel to the longitudinal direction $L_2$ of each base part 50 and thus to the longitudinal axis $L_1$ of the blade 10. The four blade damping devices 41c, 41d, 41e, 41f are divided in a first blade damping device pair 41c, 41d arranged at a first spanwise location of the blade 10 and a second blade damping device pair 41e, 41f arranged at a second spanwise location of the blade 10. One of the blade damping devices 41c, 41e of each pair is arranged on the pressure side 22 of the blade 10 and the other blade damping devices 41d, 41f of each pair is arranged on the suction side 24 of the blade 10. The first blade damping device pair 41c, 41d and the second blade damping device pair 41e, 41f are each attached to the blade 10 by first connector element 70a, 70b similar to the blade damping devices 41a, 41b of FIGS. 4a, 4b, and 5. The first blade damping device pair 41c, 41d is attached to the second blade damping device pair 41e, 41f by a second connector element 80 in the form of a strap attached to the second attachment devices 43c, 43e in the form of holes of each adjacent pressure side blade damping devices 41c, 41e. A third connector element 81 attaches the blade damping devices to the hub of the wind turbine. A fourth connector element 82 is attached to the blade damping devices and may act as a recovery line for recovering the blade damping devices when detaching them from the blade 10.

LIST OF REFERENCES 2 wind turbine
4 tower
6 nacelle
8 hub
10 blade 11 airfoil region
12 root region
13 transition region
14 blade tip
15 tip end
16 blade root
17 root end
18 leading edge
20 trailing edge
22 pressure side
24 suction side
40 shoulder
41 blade damping device
41a pressure side blade damping device
41b suction side blade damping device
42 first attachment device
43 second attachment device
50 base part
60 spoiler
70 first connector element
72 release device
80 second connector element
81 third connector element
82 fourth connector element
$a_1$ first angle
$a_2$ second angle
C chord line
$C_1$ first chord line
H height direction
$L_1$ longitudinal axis
$L_2$ longitudinal direction
$L_3$ length direction
T thickness direction

The invention claimed is:

1. A blade damping device for damping vibrations during standstill of a wind turbine blade having a root region with a root end and an airfoil region with a tip end between which ends a longitudinal axis of the wind turbine blade extends, a leading edge and a trailing edge between which a chord line extends transversely to the longitudinal axis, and a pressure side and a suction side on opposite sides of the chord line, wherein the blade damping device is adapted to be detachably attached to the pressure side and/or the suction side of the airfoil region of the wind turbine blade, the blade damping device comprising:
 a base plate adapted to conform to an exterior shape of the wind turbine blade when the blade damping device is attached to the wind turbine blade; and
 a spoiler protruding from the base plate to a spoiler height along a height direction and having a spoiler length along a length direction, the height direction being adapted to extend outwardly from the wind turbine blade,
 wherein the spoiler height is adapted to be at least 20% of a chord line length located at two thirds of a blade length along the longitudinal axis from the root end of the wind turbine blade, and
 wherein the spoiler is configured to increase air volume displaced by edgewise vibrations such that edgewise vibration damping and flow disturbance are provided by the blade damping device.

2. The blade damping device according to claim 1, wherein the base plate is adapted to cover at most 50% of the circumference of the wind turbine blade when the blade damping device is attached to the wind turbine blade.

3. The blade damping device according to claim 1, wherein a resilient material of the base plate is adapted to conform to the exterior shape of the wind turbine blade when the blade damping device is attached to the wind turbine blade.

4. The blade damping device according to claim 1, wherein the blade damping device is adapted to be positioned on the wind turbine blade at a first chord line so that the spoiler projected onto a plane normal to the first chord line has a distance along the longitudinal axis of the wind turbine blade of at least 10%, 20%, 30%, 40%, 50%, 60%, 70%, 80%, 90%, 100%, 110%, 120%, 130%, 140%, or 150% of the spoiler height.

5. The blade damping device according to claim 1, wherein the blade damping device is adapted to be positioned on the wind turbine blade at a first chord line so that the height direction forms a second angle with respect to the first chord line of more than 50, 60, 70, or 80 degrees, or the second angle is 90 degrees.

6. The blade damping device according to claim 1, wherein the base plate is elongated along a longitudinal direction, the base plate being adapted to be arranged so that the longitudinal direction is parallel with respect to the longitudinal axis of the wind turbine blade, and wherein the spoiler is oriented with the length direction at an angle of 0 degrees to less than 90 degrees with respect to the longitudinal direction of the base plate.

7. The blade damping device according to claim 1, wherein the height direction is perpendicular with respect to the base plate.

8. The blade damping device according to claim 1, wherein the blade damping device further comprises a first connector element adapted to detachably attach the blade damping device to the wind turbine blade.

9. The blade damping device according to claim 1, wherein the blade damping device further comprises a second connector element adapted to detachably attach the blade damping device to an adjacent blade damping device.

10. The blade damping device according to claim 1, wherein the base plate is adapted to extend from the suction or pressure side of the wind turbine blade, around the trailing and/or leading edge to the opposite side of the wind turbine blade.

11. The blade damping device according to claim 1, wherein the blade damping device comprises or consists essentially of a foamed polymer material and/or the spoiler comprises one or more stiffening elements which are optionally made of metal and optionally extending parallel to the height direction.

12. A kit of parts comprising:
 one or more blade damping devices according to claim 1; and
 the wind turbine blade.

13. A wind turbine blade having a root region with a root end and an airfoil region with a tip end between which ends a longitudinal axis of the wind turbine blade extends, a leading edge and a trailing edge between which a chord line extends transversely to the longitudinal axis, and a pressure side and a suction side on opposite sides of the chord line, the wind turbine blade comprising:
 a blade damping device for damping vibrations during standstill of the wind turbine blade, wherein the blade damping device comprises a base plate and a spoiler protruding from the base plate to a spoiler height along a height direction and having a spoiler length along a length direction, the height direction being adapted to extend outwardly from the wind turbine blade,
 wherein the blade damping device is detachably attached to the pressure side and/or the suction side of the airfoil region of the wind turbine blade so that the base plate of the blade damping device conforms to an exterior shape of the wind turbine blade, and wherein the spoiler height is at least 20% of a chord line length located at two thirds of a blade length along the longitudinal axis from the root end of the wind turbine blade, and wherein the spoiler is configured to increase air volume displaced by edgewise vibrations such that edgewise vibration damping and flow disturbance are provided by the blade damping device.

14. A method for damping vibrations of the wind turbine blade during standstill, comprising:
providing the kit of parts according to claim 12;
detachably attaching the one or more blade damping devices to the wind turbine blade;
installing the wind turbine blade with the one or more blade damping devices on a hub of a wind turbine; and
detaching the one or more blade damping devices from the wind turbine blade.

15. The method according to claim 14, wherein the step of detachably attaching the one or more blade damping devices to the wind turbine blade is performed by attaching a first connector element to each of the one or more blade damping devices so that each of the first connector elements extends around the circumference of the wind turbine blade and tightening each of the first connector elements so as to detachably attach the one or more blade damping devices to the wind turbine blade.

16. The method according to claim 15, wherein the step of detaching the one or more blade damping devices from the wind turbine blade is performed by activating a release device of each of the first connector elements.

17. The method according to claim 14, wherein the one or more blade damping devices include a first blade damping device and a second blade damping device, and wherein the method further comprises detachably attaching the first and second blade damping devices by a second connector element.

18. The method according to claim 14, wherein the step of detaching the one or more blade damping devices from the wind turbine blade is performed before commencing operation of the wind turbine blade.

19. The blade damping device according to claim 1, wherein the spoiler height is adapted to be at least 30%, 40%, 50%, 60%, 70%, 80%, 90%, or 100% of said chord line length.

20. The blade damping device according to claim 1, wherein the height direction is adapted to extend outwardly from the pressure side and/or suction side of the wind turbine blade.

* * * * *